United States Patent [19]

Baron

[11] Patent Number: 4,971,733
[45] Date of Patent: Nov. 20, 1990

[54] PROCESS FOR PRODUCING AN OPTICAL FIBER SENSOR

[76] Inventor: Jackie J. Baron, 11 rue Jean Marie Duclos, 69005 Lyon, France

[21] Appl. No.: 316,036

[22] Filed: Feb. 27, 1989

[30] Foreign Application Priority Data

Feb. 26, 1988 [FR] France .................................. 8802886

[51] Int. Cl.$^5$ ......................... B29D 11/00; G02B 6/02
[52] U.S. Cl. ...................................... 264/1.5; 264/1.7; 264/2.7; 264/259; 264/273; 264/291; 264/323; 427/163
[58] Field of Search ...................... 264/1.5, 1.7, 210.8, 264/2.7, 259, 273, 291, 323, 164; 427/163

[56] References Cited

U.S. PATENT DOCUMENTS

| | | | |
|---|---|---|---|
| 3,542,451 | 11/1970 | Washburn | 264/1.5 |
| 3,853,658 | 12/1974 | Ney | 156/180 |
| 4,667,001 | 5/1987 | Mizuno | 264/210.8 |
| 4,668,445 | 5/1987 | Calvet et al. | 264/1.5 |
| 4,739,025 | 4/1988 | Burch | 264/210.8 |

FOREIGN PATENT DOCUMENTS 2132047 1/1973 Fed. Rep. of Germany.
2143895 3/1973 Fed. Rep. of Germany.
2564983 11/1985 France.

OTHER PUBLICATIONS

Navy Technical Disclosure Bulletin, vol. 2, No. 7, Jul. 1977, pp. 15-20, Navy Case No. 61261; P. C. Fletcher et al.: "Liquid Crystal—Fiber Optic Cockpit Display".

Primary Examiner—James Lowe
Attorney, Agent, or Firm—Wall and Roehrig

[57] ABSTRACT

A process for manufacturing an optical fiber light sensor or panel wherein the optical fibers and the panel or sensor are formed simultaneously employing a perforated platen. The platen is covered with a layer of thermofusible product material so that the material when melted will flow through the holes in the platen to create a series of short vertical fibers. The fibers are then drawn to a desired length and sheathed before being gathered into a bundle.

10 Claims, 3 Drawing Sheets

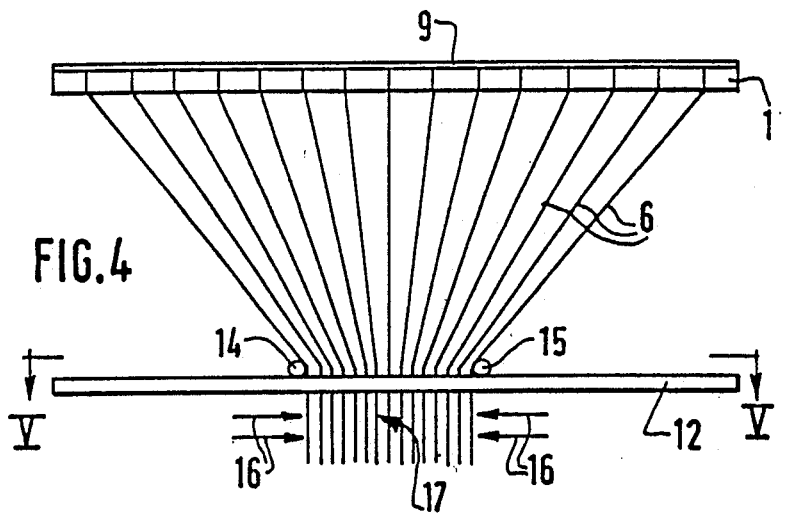
FIG.4
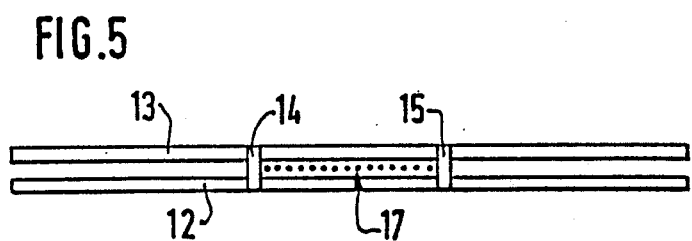
FIG.5
FIG.7
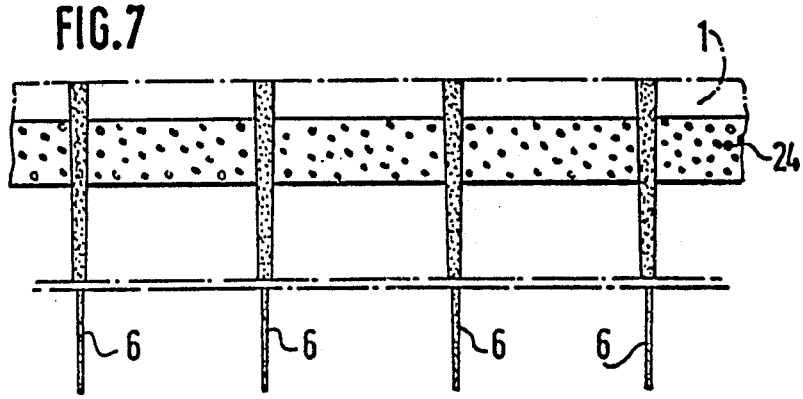

PROCESS FOR PRODUCING AN OPTICAL FIBER SENSOR

BACKGROUND OF THE INVENTION

The present invention relates to a process for the manufacture of an optical-fiber light sensor or panel, as well as to an optical-fiber light sensor or panel obtained by this process.

An optical-fiber panel is a luminous display or decoration or signalisation device which presents itself in the form of a plate, the generally plane front face of which constitutes the end of a relatively large or small number of optical fibers which traverse from front to rear the thickness of this plate so as to emerge, by their free end, flush with this front face which constitutes the surface intended to be seen.

At the rear and at a distance from this plate, these optical fibers are compacted into a bundle of optical fibers. This bundle receives light signals representing a display or other image, this image being reproduced on a large scale on the front face of the panel.

An optical-fiber light sensor is composed of a panel identical to that which has just been described, but utilizing either fibers made of synthetic material or mineral fibers in the case where this sensor is of parabolic shape, thus concentrating the solar light and heat energy. This sensor receives light information on its front face, this information representing, for example, the intensity of solar or ambient illumination, and transmits this light energy remotely to a processing component or directly to an optical-fiber panel via its bundle of optical fibers. The difference as compared with the aforementioned optical-fiber panel is thus essentially only a difference of function. In the text which follows, everything which will be stated in relation to an optical-fiber panel will apply like-wise to an optical-fiber sensor.

In an optical-fiber panel, each optical fiber thus traverses the thickness of the panel until it opens on the front face, which is visible, of the latter. The construction of these panels is currently undertaken by introducing, by manual or robotic means, one of the free ends of each optical fiber into a recess provided to this end in a perforated plane plate, which is capable of constituting the front plate of the light sensor or panel. The disadvantages of such a process are those of being either long and tedious, involving a manual construction, or too complex and costly, involving a robotic construction, so that it is finally poorly adapted to a profitable industrial exploitation, this being all the more so as it consists in a manufacture of optical fibers which are independent of that of the optical sensor or panel.

Moreover, this process does not permit the construction of panels of large size (for example 12 m$^2$) which, in order to have a correct optical definition, must consist of a very large number of fibers (approximately 180,000). Now, the implantation fiber by fiber, manually or even by robotic means, would require a length of time incompatible with the essential industrial and economic requirements.

Moreover, in the optical-fiber panel obtained by such a process, which is described, for example, in the patent U.S. Pat. No. 3,853,658, the end of each optical fiber introduced into the front plate of the panel diffuses the light only over a small angular field. This is due to the fact that the optical fiber obtained by traditional linear manufacture is sheathed over its entire length including over its end. Consequently, the image formed on such a panel exhibits "black" spots or shadow zones impairing its quality. It is possible to remedy this only by an extremely tedious operation of machining each one of the ends of the fibers, in such a manner as to increase their angular field of diffusion up to angle values greater than or equal to 70°. Nevertheless, the result obtained remains unsatisfactory.

SUMMARY OF THE INVENTION

The object of the invention is to remedy these disadvantages. To this end, the subject of the invention is a process for the manufacture of an optical fiber light sensor or panel, in which the light sensor or panel and its optical fibers are constructed simultaneously in a same succession of operations which consists:

in constructing a matrix which may be intended to form the front plate of the optical-fiber sensor or panel, this plate, which is temperature-resistant, being perforated by orifices, which are distributed in accordance with a right-angled grid and which are of diameters equal to those desired for the end, on the panel side, of the fibers;

in covering this matrix, in the horizontal position, with a layer of the thermoplastic product constituting the optical fibers, and brought in known manner to its melting temperature, in such a manner that the product flows, by gravity, eventually preceded by a commencing phase, through the orifices of the plate to form a bundle of vertical fibers of short length, hanging below this plate;

in stopping the fusion before the layer of product is entirely consumed, thus leaving a residual layer on the plate;

in drawing the bundle of fibers, while heating it to a temperature at least equal to its softening temperature, so as to obtain a desired length;

in sheathing these fibers by means of an auxiliary sheathing product;

in gathering the fibers into a homogeneous bundle capable of constituting on its free end an optical window for the conduction or for the transmission of light signals.

According to an advantageous feature of the invention, the material for forming the fibers takes the form of a plate disposed on the perforated plate and then brought to its melting point.

According to another feature of the invention, the perforated matrix is placed in a frame in such a manner as to form together with the latter a cell of given depth, which is adjusted in order that the filling space which is left available should determine the quantity of thermoplastic material to be used, the heating intended to done its softening being ensured by infrared radiation and/or by filtered and heated air, or by any other process suitable for this application.

According to a variant of implementation of the process, the non-fluid residual layer of the plate is entirely eliminated, while the fibers are enclosed, over a part of their lengths emerging directly below the plate, in a panel consisting of a binding material capable of maintaining them in relative positions identical to those defined by the plate. The latter may then be retracted.

These arrangements permit the obtaining of a panel or sensor, the ends of which, being situated within the plate, are free from sheathing. In the case of light panels, the angular field of diffusion of each fiber is then greater than 70° and the quality of the image obtained is thus very satisfactory.

Moreover, in this process, the panel or sensor and its optical fibers are obtained simultaneously by the same succession of operations. It is clear that this results in a saving of time which is significant in reducing the cost of manufacture.

The subject of the invention is likewise an optical-fiber light sensor or panel which is constructed in accordance with this process. This panel or sensor is covered, on its front face, with a layer of optical fiber material from which the optical fibers were drawn to form an integral unit of panel and fibers with the visible ends of these optical fibers. The optical fibers of such a sensor or panel have a slightly frustoconical shape; this usefully permits a considerable reduction of the dimensions of the emission window and the limitation of the losses of light energy.

BRIEF DESCRIPTION OF THE DRAWINGS

In any event, the invention will be properly understood and its advantages and other features will emerge, in the course of the following description, of the two embodiments of an optical-fiber light panel, in view of the accompanying figures in which:

FIG. 4 diagrammatically represents the phase of gathering and compacting of the bundle of fibers;

FIG. 5 is a cross-sectional view long V—V of FIG. 4;

FIG. 7 is a partial vertical cross-section, of a panel or sensor obtained by a variant of the process.

DESCRIPTION OF THE INVENTION

Figure 1:
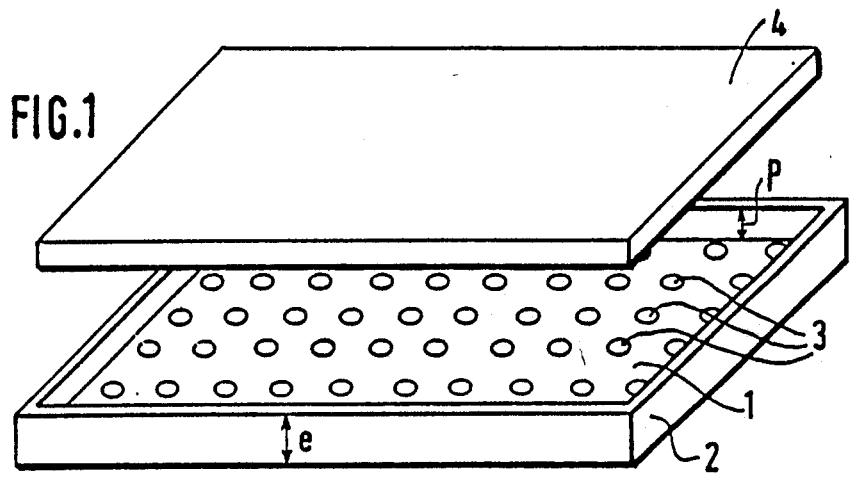
FIG. 1 shows, in diagrammatic perspective, the preparation phase.

In order to facilitate understanding, the spacing between two contiguous optical fibers, and the thickness of the residual layer, are exaggerated in the drawings.

With reference to FIG. 1, a start is made, in order to construct this optical-fiber panel, from an aluminum plate (1), of dimensions equal to those desired for the front plate of the panel. This plate (1), previously degreased and dusted, is pierced with a large number of transverse perforations (3). These perforations are distributed in accordance with a right-angled grid, in accordance with that desired for the distribution of the end points of the optical fibers on the front face of the panel. The diameter of these orifices is equal to that desired for the end, on the panel side, of the optical fibers. This plate (1) must withstand the subsequent conditions of flowing. Accordingly, this may also be a composite plate made of aluminum and a ceramic material that will withstand the heat necessary for the melting and flowing operations to be described.

The plate or matrix (1) is maintained strictly horizontal within a frame (2), which is also made of aluminum and which is fixed to a framework (not shown). This frame (2) is of thickness e greater than that of the plate (1), so that the assembly (1, 2) forms a rectangular cell of depth p.

On the plate (1) there is placed a rectangular plate (4) made of polymerized acrylic material, corresponding to the material constituting the optical fibers. The plate (4) is of thickness substantially equal to the depth p of the cell (1, 2) and is of length and width which are substantially equal to those of the aluminum plate (1), apart from the clearance able to permit the introduction of this plate (4) into the cell (1, 2).

It should be noted that the material constituting the fibers may be presented in any other appropriate form, such as a premetered quantity of granules.

In a variant, the plate (4) may be constructed of other material, especially mineral, which is capable of being formed into optical fibers.

Figure 2:
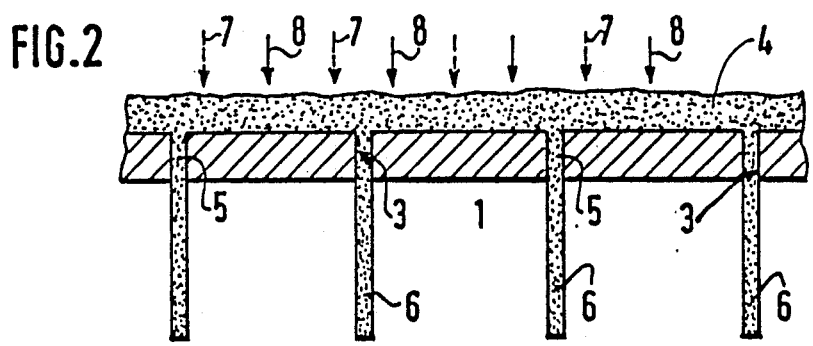
FIG. 2 shows, in partial vertical cross-section, the phase of melting and of flowing of the product.

The following operation, which is diagrammatically represented in FIG. 2, is effected in a dustless area free from particles of size exceeding 0.1 μm which are capable of irremediably impairing the quality of the optical fibers. It consists in heating the plate (4) in order to cause it to melt, allowing the molten product to flow by gravity through the perforations (3); to form vertical filaments (5) which hang (6) below the matrix (1) for a distance of one to three meters below the latter. The fusion of the layer of acrylic material (4) is undertaken by heating the aluminum matrix (1) and the layer (4) itself by means of infrared rays (7), which avoids stirring up the ambient air, or by jets (8) of pulsed hot air, which is previously filtered.

This heating is arrested when the thickness of the layer (4) has become fine enough to leave in existence on the matrix (1) only a residual layer (9) (FIG. 3) of predetermined thickness, for example in the order of one millimeter. In order to prevent the thermal inertia stored in the acrylic material and in the matrix (1) from causing the total flowing of the layer (9) through holes 3, a rapid cooling of the latter is undertaken by means of jets of previously filtered cold air.

For example as the thickness of residual layer 9 approaches one millimeter, cold air having a temperature of 10° C. may be directed on the residual layer to stop any further flow.

The depth p of the cell, (1, 2) (FIG. 1) is adjusted in order that the filling space which it leaves available should determine the quantity of acrylic material to be used. This quantity of material may likewise be predetermined by the thickness of the plate (4).

In an alternative embodiment, the acrylic material may be premetered and melted before pouring on the plate (1).

Figure 3:
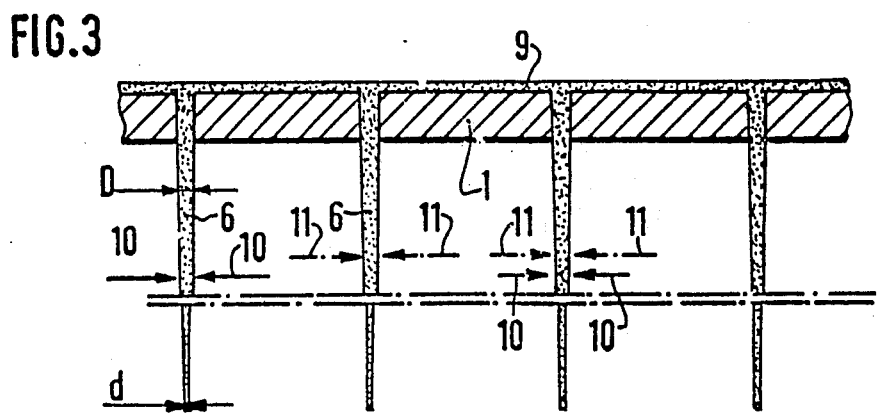
FIG. 3 is a view similar to FIG. 2 showing the following phases of elongation of the fibers.

Reverting to FIG. 3, the following operation consists in elongating the fibers (6) so as to obtain a length of 5 to 20 meters, for example. To do this, the heating of these hanging fibers (6) is commenced, below the plate (1) which is maintained cold, until such time as the fibers become malleable. This heating is, for example, effected in known manner by jets (10) of air which is filtered and heated to approximately 100° to 250° C. When these fibers (6) have reached a sufficient temperature, a linear pull is exerted, for example of 10 to 20 g/mm$^2$ for a temperature of the fibers in the order of 190° C. over all the fibers (6), until the desired length is obtained. What is then obtained is a set of elongated fibers of frustoconical shape, having an initial diameter D equal to that of the perforations (3), and a final diameter d which is far smaller. The drawing temperature varies as a function of the nature of the constitutive material (4).

The operation of commencing the flow of the filaments (6) through the orifices (3) is undertaken in a known manner, for example by exerting a pressure on the upper face of the plate (4) or a reduced pressure on its lower face.

The drawing is undertaken in a known manner by spinning-extrusion. It is possible to draw these fibers by any appropriate means, such as motor-driven rollers. Most generally, the drawing is undertaken naturally under the effect of gravity.

After cooling the set, the fibers (6) are coated over the entire length of their parts situated outside the matrix (1) by dipping or spraying through jets (11) of an atomized solution, which is allowed to harden when this coating operation is completed. This solution, for example of polyvinyl acetate, is of known composition and possesses a refractive index less than that of the fibers (6).

The fibers may eventually be exempt of mechanical protection sheath.

The array of fibers (6) is then completed and nothing remains other than to assemble it and to compact it into a homogeneous optical bundle in which the fibers are distributed in a manner strictly in accordance with their distribution on the front of the plate (1).

This operation is diagrammatically represented in FIGS. 4 and 5. First of all, all the fibers (6) are cut to the same length, for example by laser cutting. Then, by means of a set of two parallel rules (12, 13) associated with two cursors (14, 15), the free ends of the fibers are regrouped per row by captively retaining them as represented between the two rules (12, 13) on the one hand (thickness of one row) and the two cursors (14, 15) on the other hand (length of one row). This row is then cemented by jets (16) of quicksetting cement, and this operation is repeated as many times as there are rows of fibers to regroup, each row preferably corresponding to the smaller side of the rectangle formed by the matrix (1).

Figure 6:
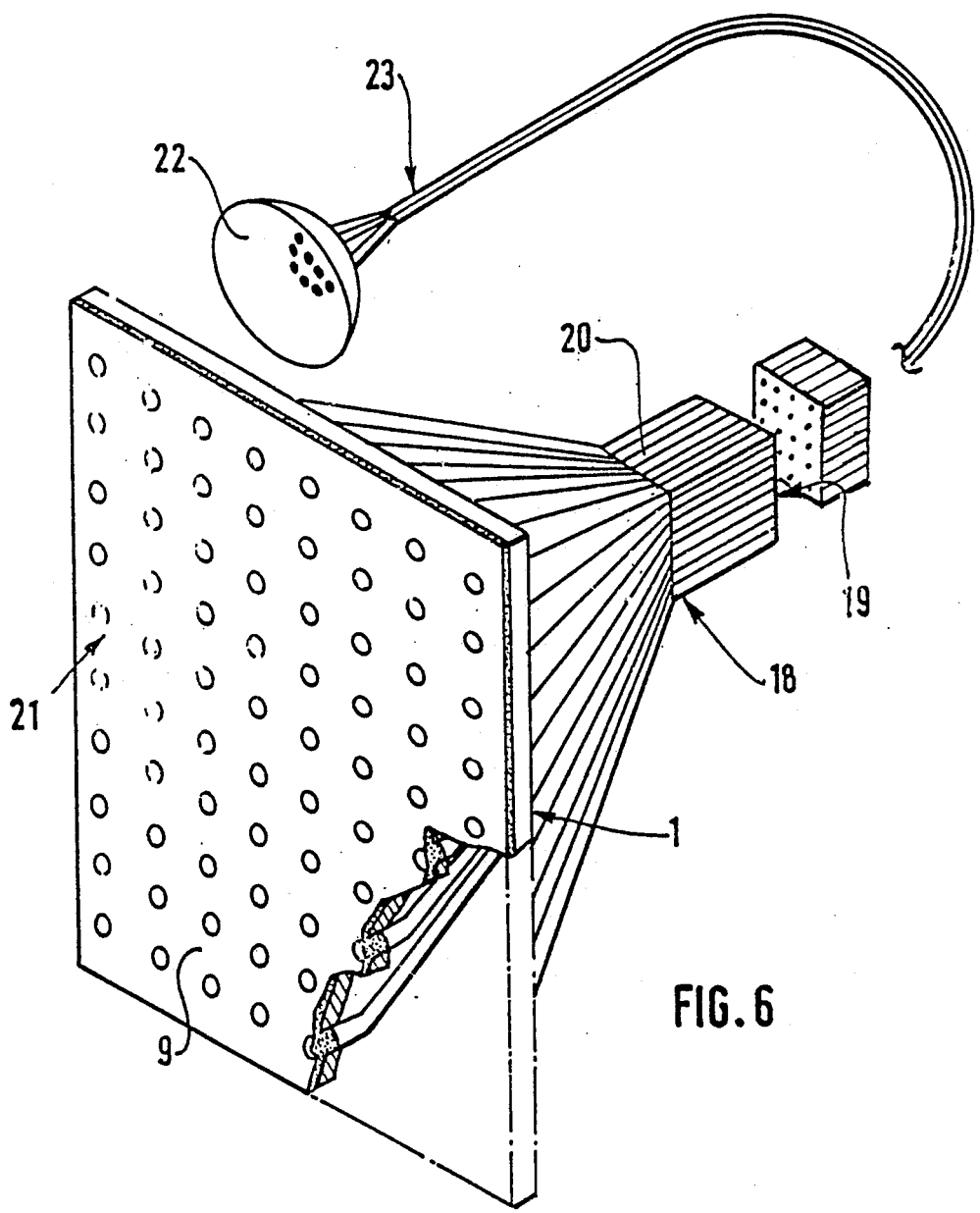
FIG. 6 shows, in partial cutaway perspective, this light panel ready for use and also equipped with an optical sensor constructed by the same process.

When all the rows of fibers are thus assembled and cemented, the vertical plates obtained (17) are themselves assembled and cemented to one another in order to form a single homogeneous block (20) at the location of the free ends of the fibers (6) thus constituting the emission window or end face (19) of the optical bundle (18) thus obtained (FIG. 6).

These free ends of the fibers (6) are distributed in a homologous manner at the corresponding ends of these fibers (6) situated on the front face (21) of the panel (1). In order words, for an end of a fiber (6) situated in the top left hand corner of the panel, the other corresponding end is situated in the top left hand corner of the window (19).

The next operation to be performed is the finishing grinding of the end face (19) of the optical bundle (18) (FIG. 6) opposite the panel (1).

The optical-fiber panel which is finally obtained is represented broadly in FIG. 6. It comprises on its front face (21) a protective layer (9), which, corresponds with the residual layer 9 of FIG. 3 and which forms a homogeneous termination for the optical fibers 6 whithout any optical interfaces. This results in forming an optical screen integral with each fiber and ensuring a good distribution of the luminous fluxes.

The thickness of the residual layer (9) determines two parameters, namely the ridigity at the front face of the panel and the angle of intersection of the angular fields of emission of the optical fibers and thus the optical definition of the image displayed on or transmitted from the panel.

Referring again to FIG. 6 there is shown a light sensor (22), of parabolic shape, which is constructecd by the same process as the optical-fiber panel (9) and which preferably transmits by its exit optical bundle (23) the surrounding light information, of solar intensity of illumination for example, to a regulating component which controls the emission of thermal light emanating from any appropriate source on the panel (1) from the window (19), in order, for example, to correct the luminosity index of this panel (1) as a function of the ambient light.

As is diagrammatically shown in FIG. 6, the sensor may likewise supply the light energy directly to the emission window (19) of the optical bundle (18) via its optical bundle (23). This parabolic arrangement (22) advantageously permits the construction of self-illuminating panels, i.e. which are autonomous, or at the very least self compensating for excessive afflux of external light.

This leads to the obtaining of independent light panels consisting, at the location of the outer face, of a panel (9) per se, which is plane or arched, of the face towards which there emerges a plurality of individual optical fibers, parallel to one another, the constitutive material of which is identical to that of the said panel (9), and which do not exhibit any solution of discontinuity. The free ends of these fibers (6), of diameter less than the diameter of the fibers in the immediate vicinity of the panel (9), are gathered in a homologous manner into an optical bundle (18), which is itself extended in an emission window (19).

Thus the uniqueness of such a panel consists in the absence of any physical or optical discontinuity between the residual layer (9), and the fibers (6), i.e. the visible part of said panel and the emission window (19).

Another embodiment of the panel according to the invention is represented in FIG. 7. As it may be observed, the coating of the fibers (6) as they emerge directly from the non-visible face of the matrix (1), which is represented in mixed lines in FIG. 7, takes the form of panel (24). The latter is constructed from a binding material, especially synthetic material, such as polyurethane foam compatible with the polyvinyl acetate coating described above of the fibers (6), which embeds a part of the length of the fibers in such a manner as to maintain them in relative positions identical to those defined by the matrix (1).

This inclusion on the rear face of the matrix (1) of said panel essentially acts as a stiffening element for said panel, after the initial constructing phase above described.

Thus this permits the eventual withdrawal of this matrix (1) in such a manner as to recover it for its use in subsequent production runs. Thus, the panel (24) exhibits on its face, previously in contact with the matrix (1), the ends of the fibers (6) which project and thus constitutes the supporting screen for the image. In that case, the residual layer (9) has been entirely eliminated, for example by grinding.

In order to construct this variant, first of all the polyurethane resin is poured onto the reverse face of the matrix (1). Once the hardening has taken place, the panel is turned over and after having removed the residual layer (9), particularly by grinding, the matrix (1) is removed by simple traction, thus releasing the ends of the optical fibers (6) maintained initially in the orifices (3), said ends then projecting on the front face of the panel (24).

As is self-evident, the invention is in no sense limited to the embodiment which has just been described. The perforated plate may be made of a metal other than aluminum, and may even be constructed of plastic material, resin, wood, or some other material compatible with that used for the fibers and permitting the formation of the front plate. It is preferable that the frame (2) should be made from the same material as the matrix (1), in order to have the same mechanical stress, irrespective of the temperature. The orifices (3) may have any cross-section other than circular, for example square, triangular, lozenge-shaped, multi-lobed or other. The surface appearance of the protective layer (9) may be made smooth or granular, depending upon the particle size of the abrasive used. This layer (9) may likewise be surface-tinted or may undergo a treatment against the ultraviolet rays. It may be deformed, possibly with the plate (1), in order to obtain a surface of concave or convex curvature, especially to improve the resistance and to increase the field of diffusion.

Accordingly, the present invention is associated with various advantages, which the processes known up to the present time do not permit to be obtained. It is possible to refer to the following:

a process which is easy and rapid to implement, thus making its industrialization cost very competitive;

the absence of physical optical discontinuity between optical fibers and panel, which significantly improves the optical quality of such panels;

the possibility of obtaining very small emission windows, while maintaining an excellent resolution, on account of the drawing of the fibers.

In this manner, the panels obtained may be used in all the known applications. They are, in particular, very well suited to the illumination of sensitive premises in cold light, that is to say in the absence of the release of heat and in the absence of a source of electrical energy. Likewise, they are suited to submarine illumination and to information or image transfers.

They are also suited to advertising display panels, this being the case without a source of energy. Finally, on account of their markedly improved optical qualities, they may be used as a keyboard operating by non-contact command.

I claim:

1. A process for producing an optical fiber sensor that includes the steps of providing a platen having a plurality of holes passing therethrough, said holes being of a given diameter and space in a predetermined pattern, supporting the platen in a horizontal position, placing a thermoplastic material capable of forming optical fibers on the top of said platen and heating said material to at least its melting temperature; allowing a substantial portion of the melted material thus obtained to flow through said holes to form a bundle of fibers that hang beneath said platen, stopping the heating of the material to leave a residual solid layer of said thermoplastic material on the matrix; and thermally softening the fibers that hang beneath said platen and drawing the softened fibers to a desired length.

2. The process of claim 1 that includes the further steps of:

cooling said fibers to solidify them;

placing an outer coating over the drawn fibers by spraying an atomized solution of a material having a refractive index less than that of the fibers over the outer surface thereof.

3. The process of claim 1 that includes the further step of gathering the free ends of the drawn fibers into a bundle so that the free ends of the fibers provide a window for the passage of light into and out of the bundle.

4. The process of claim 1 wherein the thermoplastic material to be melted is placed on the top of the platen in the form of a solid plate prior to heating the material.

5. The process of claim 1 wherein the platen is placed within a frame and a predetermined quantity of thermoplastic material is placed in the frame over the platen prior to heating.

6. The process of claim 1 that includes drawing the softened fibers to a desired length by applying an external pulling pressure on the fibers.

7. The process of claim 3 wherein the fibers are gathered into multiple parallel rows wherein the relative position of each fiber in the bundle remains the same at both ends of the bundle.

8. The process of claim 1 that includes the further step of enclosing the top end of the fibers within a binder to maintain the fibers in a desired alignment.

9. The process of claim 8 that includes the further step of removing the solid layer of said thermoplastic material from the top of the platen and removing the platen from the ends of the fibers whereby the fibers are supported in the binder.

10. The process of claim 9 that includes the further step of optically grinding the ends of the fiber.

* * * * *